United States Patent [19]

Bashline et al.

[11] 3,895,663

[45] July 22, 1975

[54] LOCKING DEVICE FOR THREADED FASTENERS

[75] Inventors: John D. Bashline; Charles A. Dravis, both of Flushing, Ohio; Richard D. Frye, Erie, Mich.

[73] Assignee: Donald R. Hunsche, Cincinnati, Ohio

[22] Filed: Mar. 15, 1973

[21] Appl. No.: 341,398

[52] U.S. Cl. .................................. 151/34; 151/35
[51] Int. Cl.$^2$ ........................................ F16B 39/28
[58] Field of Search ........................ 151/34, 35, 36

[56] References Cited
UNITED STATES PATENTS

| | | | |
|---|---|---|---|
| 1,180,561 | 4/1916 | Bateman | 151/34 |
| 1,427,946 | 9/1922 | Ensign | 151/36 |
| 2,778,399 | 1/1957 | Mroz | 151/35 |
| 3,263,727 | 8/1966 | Herpolsheimer | 151/34 |
| 3,329,190 | 7/1967 | Oldenkott | 151/35 |

FOREIGN PATENTS OR APPLICATIONS

| | | | |
|---|---|---|---|
| 514,923 | 11/1939 | United Kingdom | 151/34 |

Primary Examiner—Edward C. Allen
Attorney, Agent, or Firm—Boylance, Abrams, Berdo & Kaul

[57] ABSTRACT

Locking device for threaded fasteners, such as a bolt-and-nut type fastener, comprising two annular washer members each having a toothed face and a cam face, the washers being arranged cam face-to-cam face with the toothed faces engaging, e.g., a part to be secured by the fastener and a face of the nut, the cam faces having fast taper cam surfaces disposed to coact, under the influence of tightening torque on the fastener, to force the two washer members axially apart and thereby positively insert teeth of the washer members into the respective adjacent fastener parts. The toothed face of each washer member advantageously includes teeth in the form of points and teeth in the form of straight edges, the point teeth being disposed between adjacent straight edge teeth. One of the washer members can be replaced by cam faces made integral with the nut.

3 Claims, 11 Drawing Figures

PATENTED JUL 22 1975
3,895,663
SHEET 1
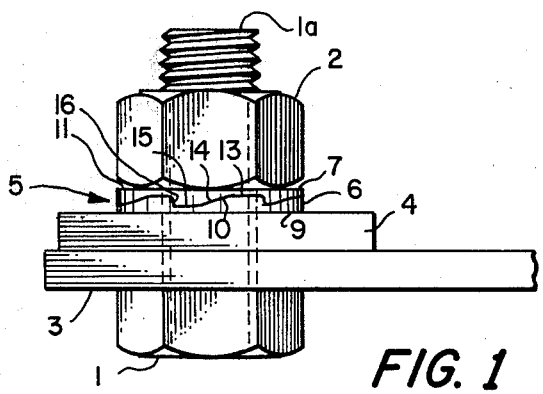
FIG. 1
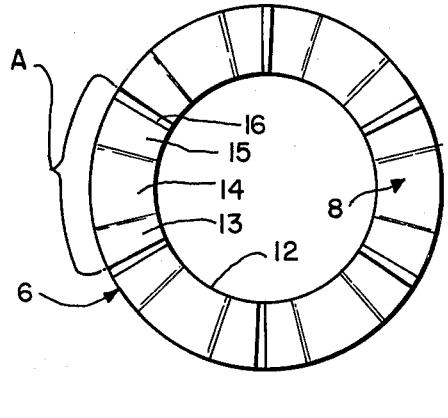
FIG. 2
FIG. 3
FIG. 4
FIG. 5
FIG. 7

LOCKING DEVICE FOR THREADED FASTENERS

BACKGROUND OF THE INVENTION

It has long been proposed to lock threaded fasteners, such as the usual bolt-and-nut type of fastener, by using two cooperating lock washer members each having a friction face and a cam face, the washer members being arranged cam face-to-cam face between, e.g., the nut and a member to be secured by the fastener, the two cam faces being mated, that is, each high point of one cam face being accommodated by a low point of the other. The friction faces of the two washer members respectively engage, e.g., the exposed surface of the member to be secured, and the adjacent face of the nut. Alternatively, a single such washer member has been proposed, the second cam face then being presented, e.g., by the nut. Locking devices of this general type are disclosed, for example, in the following U.S. Pat. Nos.

| | |
|---|---|
| 428,183 | Trimble et al |
| 618,436 | Parker |
| 625,529 | Andress |
| 678,293 | Clark |
| 1,180,561 | Bateman |
| 3,241,589 | Enders |
| 3,263,727 | Herpolsheimer |
| 3,329,190 | Oldenkott. |

Such devices depend for operability on a secure engagement between the friction faces and the members adjacent thereto, and on cam surfaces which oppose rotation of the nut, for example, in the loosening direction and which are inclined at an angle greater than the thread rise of the fastener to be locked.

Though such locking devices are advantageous, particularly because they prevent the fastener from loosening under vibration, their broad acceptance has been prevented by a number of difficulties. One difficulty is that the friction face must prevent relative rotation between the washer members, on the one hand, and the respective adjacent members of the fastener assembly, on the other hand, and the devices heretofore proposed have been deficient in this regard. Thus, even though the friction faces have been provided with teeth to engage the adjacent surfaces, the teeth have tended to scrape across and score the adjacent surface as the fastener is tightened, so that, in the fully tightened assembly, the teeth are not inserted in the adjacent members adequately to assure a good lock against relative rotation. A further frequent disadvantage of the prior-art devices has been failure of the friction face to provide adequately distributed support against fracture of the washer member under the high compression loads applied by the fastener.

OBJECTS OF THE INVENTION

A general object of the invention is to devise a locking device, of the general type referred to, in which the friction faces of the two washer members are toothed and the cam faces are of such nature that the teeth are caused to be positively inserted in the respective adjacent members as the fastener is tightened.

Another object is to provide such a locking device wherein relative rotational movement between the toothed faces of the washer members and the respective adjacent members of the fastener assembly during tightening is minimized.

A further object is to provide such a locking device in which the two washer members are resiliently stressed in a fashion such as to preserve tooth insertion after the fastener has been tightened.

Yet another object is to devise locking means of the type referred to wherein the friction face of the washer member serves both to effect an adequate frictional engagement and to afford adequate support to prevent fracture of the washer member.

A still further object is to provide, in such a fastener locking means, a washer member which can be manufactured at a cost which the trade can tolerate.

SUMMARY OF THE INVENTION

Briefly considered, locking devices according to the invention comprise two cooperating lock members, one of which is a washer member having a toothed face and a cam face, the other being either an identical washer member or a part of the fastener assembly having a like cam face. The cam faces each consist of a closed circular series of groups of cam surfaces, each group including, in order of sequence, a crown surface, a slow taper cam surface, a low surface, and a fast taper cam surface, the slow taper and fast taper surfaces of each group being inclined toward each other, the fast taper cam surface of each group joining the crown surface of the next successive group. The cam surfaces are so oriented that, when the two lock members are mated cam-face-to-cam face, the order of the cam surfaces when considered in the direction of rotation which tightens the fastener is such that the crown surface is first and the fast taper cam surface last in each group. When the fastener is tightened, the fast taper cam surfaces of one lock member coact with those of the other lock member in such fashion as to force the two lock members axially apart, a significant axial separation resulting from only a small rotational displacement between the two lock members. Such axial separation causes positive insertion of the teeth into the adjacent member, and does so before there has been enough relative rotation to cause the teeth to scrape and score the adjacent member. Advantageously, the toothed face includes a plurality of raised edges, which constitute elongated teeth and extend at least generally radially of the washer member, and a plurality of pairs of raised points, each such pair of raised points being spaced apart radially of the washer member, with one point of each pair adjacent the inner periphery thereof and the other point adjacent the outer periphery, and with each pair of points located between a different adjacent pair of the raised edges.

In order that the manner in which the foregoing and other objects are achieved according to the invention can be understood in detail, particularly advantageous embodiments thereof will be described with reference to the accompanying drawings, which form a part of the original disclosure hereof, and wherein:

FIG. 1 is a side elevational view of a fastener according to one embodiment of the invention;

FIG. 2 is a plan elevational view, taken from the cam face side, of one of two identical washer members employed in the fastener of FIG. 1;

FIG. 3 is a plan elevational view, taken from the toothed face side, of the washer member of FIG. 2;

Figure 6:
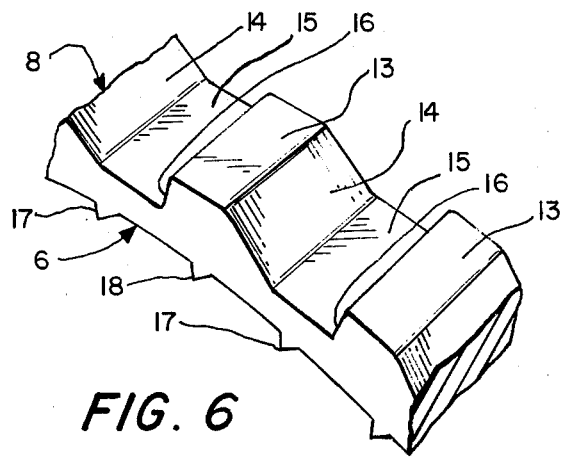
Figure 8:
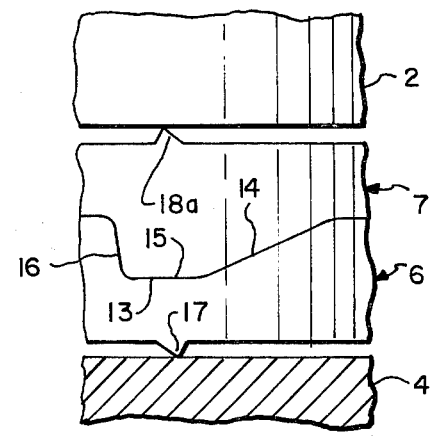
Figure 8A:
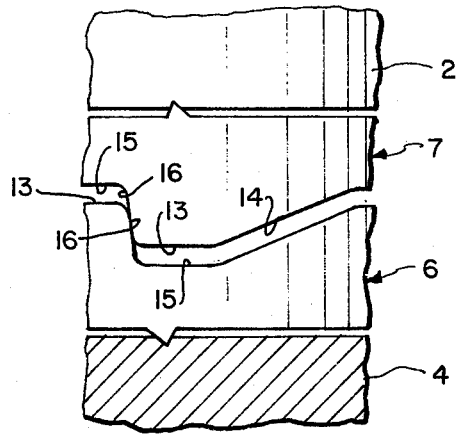
Figure 10:
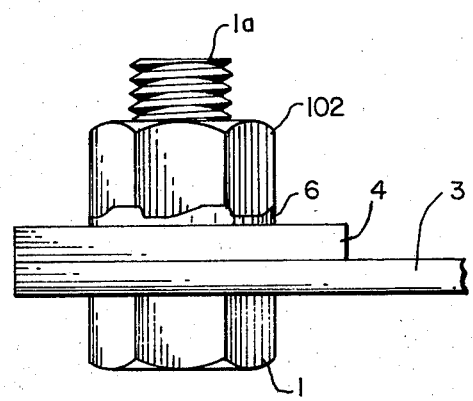
Figure 9:
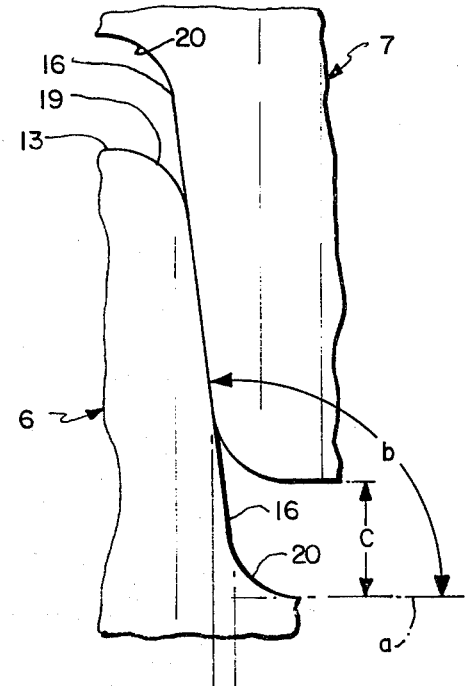

FIGS. 4 and 5 are enlarged fragmentary sectional views taken generally on lines 4—4 and 5—5, FIG. 3, respectively;

FIG. 6 is an enlarged fragmentary perspective view of a portion of the cam face of the washer member of FIG. 2;

FIG. 7 is an enlarged fragmentary perspective view of a portion of the toothed face of the washer member;

FIG. 8 is an enlarged fragmentary side elevational view of a portion of the fastener of FIG. 1, showing the relation of the parts thereof preparatory to tightening;

FIG. 8A is a view similar to FIG. 1 but showing the relation of the parts after the fastener has been fully tightened;

FIG. 9 is an enlarged fragmentary side elevational view illustrating the manner in which certain cam surfaces of the two washer members of the fastener of FIG. 1 coact to cause axial separation of the washer members as the fastener is tightened; and FIG. 10 is a view similar to FIG. 1 of a fastener according to another embodiment of the invention.

DETAILED DESCRIPTION OF THE EMBODIMENT OF FIGS. 1–9

FIGS. 1–9 illustrate a typical application of the invention in which a conventional bolt 1, FIG. 1, and nut 2 are employed to secure together two flat members 3 and 4, the nut 2 being locked by a lock washer device, indicated generally at 5 in FIG. 1, constructed according to one embodiment of the invention. Lock washer device 5 comprises two annular washer members 6, 7 formed of rigid material such as steel or a high strength polymeric material. Washer member 6 has a cam face 8 and a toothed face 9. Washer member 7 similarly has a cam face 10 and a toothed face 11. In the assembled fastener, the two washer members are disposed cam face-to-cam face, with the toothed face 9 of washer member 6 engaging the adjacent face of member 4 and the toothed face 11 of washer member 7 engaging the adjacent end face of nut 2.

Washer members 6, 7 are identical, therefore only member 6 will be described in detail. Member 6 is circular and has a central opening 12 of a diameter such as to freely accommodate the shank 1a of bolt 1. As best seen by comparing FIGS. 1 and 2, the cam face 8 of member 6 comprises a closed annular series of groups A of surfaces, each group A including a crown surface 13, a slow taper cam surface 14, a low surface 15, and fast taper cam surface 16, surface 16 being inclined oppositely with respect to surface 14 and joining the crown surface 13 of the next successive group of surfaces. Adjacent pairs of the surfaces 13–16 join each other along lines which are radial with respect to circular opening 12. With cam faces 8 and 10 mated, the crown surfaces 13 of one cam face engage the low surfaces 15 of the other cam face, the cam surfaces 14 of the two faces are respectively engaged, and cam surfaces 16 of the two faces are also respectively engaged.

Friction face 9 is flat, being interrupted only by a plurality of straight radially extending raised edges 17 and a plurality of pairs of raised points 18 and 18a. Points 18 and 18a of each pair of points are spaced apart radially of the washer member, with points 18 located at the inner periphery thereof and points 18a located at the outer periphery. Raised edges 17 are equally spaced circumferentially of the washer member. Each pair of raised points 18, 18a is located midway between a different adjacent pair of the raised edges 17. Each of the raised edges 17 extends completely across the radial width of face 9 and is located opposite one of the low surfaces 15 of the cam face 8 of the washer member. Each pair of points 18, 18a defines a radial line across face 9 and is located opposite one of the crown surfaces 13. Raised points 18 and 18a are each approximately in the form of a truncated pyramid having a triangular base and generally triangular sides, one side of each point 18 lying in the plane of the inner periphery of the washer member and one side of each point 18a lying in the plane of the outer periphery of the washer member. Raised points 18, 18a and raised edges 17 can be considered as having faces which are directed in a tightening direction (such as face 17a, FIG. 4) and faces directed in a loosening direction (such as face 17b, FIG. 4) relative to tightening and loosening of the fastener. Both such faces are inclined, relative to the plane of the washer member, at a substantial angle. Both such faces can be inclined at, e.g., 60°, or the face directed in the tightening direction can be inclined at a smaller angle than the other face. Thus, raised edges 17 can be considered as independent straight teeth of generally triangular transverse cross section, and points 18, 18a can be considered as independent generally pyramidal teeth. Referring to FIGS. 4, 6 and 7, it will be seen that the raised edges 17 project from face 9 for a distance which is a substantial fraction of the space between the common plane of surfaces 15 and the plane of face 9. Thus, in the embodiment illustrated, the height of the straight teeth constituted by edges 17 is on the order of one-third the thickness of the portions of the washer member occupied by those teeth. Considering FIGS. 4–7, it is seen that the generally pyramidal teeth 18, 18a are of essentially the same height as the straight teeth 17.

The combination of raised edges 17 and pairs of raised points 18, 18a is advantageous because it affords a more positive engagement with the adjacent surface, such as the surface of member 4, or nut 2, FIG. 1, than is possible with raised edges alone, yet affords adequate and well distributed support for the washer member to prevent the washer member from fracturing when loaded under compression as the nut 2 is tightened in the assembly shown in FIG. 1. Further, location of the raised points 18, 18a at the respective inner and outer peripheries of the washer member assures a maximum penetration of or frictional engagement with the adjacent surface against which the washer member is disposed.

As best seen in FIGS. 8–9, fast taper cam surfaces 16 are inclined with respect to the plane $a$ of the washer member at an angle $b$ which is in the range of 93°–135°. In this embodiment of the invention, crown surfaces 13 are flat and lie in a common plane parallel to plane $a$, and low surfaces 15 are flat and lie in a common plane parallel to plane $a$. As seen in FIGS. 2, 6 and 7, the flat crown surfaces 13 and flat low surfaces 15 have a substantial length circumferentially of the washer member. The common plane occupied by the low surfaces 15 is substantially nearer the flat annular main surface of toothed face 9 than is the common plane occupied by crown surfaces 13. Hence, each low surface 15 combines with the inner and outer peripheries of the washer member and with the toothed face 9 to define a relatively thin portion of the washer member. Similarly, each crown surface 15 combines with the inner and outer peripheries and with the toothed face 9 to define a relatively thicker portion of the washer member, such thicker portion being supplemented by the adjoining end portion of the slow taper cam surface 14. At the juncture between each adjacent pair of fast taper cam surfaces 16 and crown surfaces 13, the cam face is smoothly rounded in convex fashion, as indicated at 19, FIG. 9. At the juncture between each adjacent pair of low surfaces 15 and fast taper cam surfaces 16, the cam face is smoothly rounded in concave fashion, as indicated at 20, FIG. 9. Surfaces 14 and 16 are advantageously flat.

Surfaces 13–16 are so arranged that, when the washer members are arranged cam face-to-cam face and placed on bolt 1, the fast taper cam surfaces 16 are last in each group A when the order of sequence is considered in the direction of tightening rotation of nut 2. In the initial assembly, as shown in FIG. 8, teeth 17–18a engage the adjacent faces of member 4 and nut 2 but are not significantly inserted into those members, but such engagement is adequate to assure that, when a tightening torque is applied to the nut, washer member 7 will tend to rotate with the nut while washer member 6 tends to stay fixed against member 4. Accordingly, tightening torque applied to nut 2 drives washer member 7 in a direction to force fast taper cam surfaces 16 of that member against fast taper cam surfaces 16 of washer member 6. As tightening torque continues, the two fast taper cam surfaces coact to cause members 6 and 7 to be axially separated through a significant distance c, FIG. 9. Such axial separation results from a markedly smaller rotational displacement d, FIG. 9, of member 7 relative to member 6. Accordingly, as will be clear from FIG. 8A, the small rotational displacement d causes teeth 17–18a to be positively inserted into the nut 2 and member 4, respectively, so that washer member 6 is securely locked against rotation relative to member 4 and washer member 7 is securely locked against rotation relative to nut 2. Ignoring such relatively minute stretching of the bolt as may occur from high tightening torques, separation c is essentially equal to the sum of the distances through which the two sets of teeth 17–18a are inserted into nut 2 and member 4.

After the fastener has been fully tightened, the combination of washer members 6, 7 is held between nut 2 and member 4 under a high axial clamping force, and it would appear that this force would tend to urge the combination of nut 2 and washer member 7 to rotate in a loosening direction to allow the two washer members to return to the mated positions. Such rotation would tend to withdraw teeth 17–18a from their inserted positions relative to nut 2 and member 4 and would, therefore, tend to defeat the purpose of the locking device. However, such loosening rotation of the nut and its associated washer member 7 does not occur to any significant effect, being inhibited by the action of teeth 17. Considering FIGS. 3 and 4, it will be noted that, while the point-like teeth 18, 18a are opposite the respective crown surfaces 13 and therefore axially supported by the thicker portions of the washer members and the direct engagement of surfaces 16, the full width teeth 17 are opposite the respective low surfaces 15 and are therefore carried by portions of the washer members which are relatively thin. Accordingly, as the engaged pairs of fast taper cam surfaces 16 coact, during tightening of the fastener, to cause the axial separation c, the force acting on the washer members tends not only to insert the teeth into nut 2 and member 4 but also to resiliently deflect the thinner portions of each washer member, at surfaces 15, toward the other washer member, and the resulting deformation of the washer members persists in the tightened fastener assembly. This deflection occurs because the full teeth 17 are more difficult to insert than are the point teeth 18, 18a, and because the full teeth are carried by the thinner portions of the washer member while the point teeth are carried by the thicker portions thereof. Such deformation not only reduces the overall effective separation of the two washer members to a value less than distance c but also tends to bind the coacting cam surfaces 16 against relative movement. Thus, while a negligible amount of "backing off" of the nut may occur, the parts continue essentially in the relative positions shown in FIG. 8A, and the fastener remains securely locked so long as bolt 1 is not allowed to turn relative to the other parts of the assembly. Surprisingly, when subjected to vibratory forces axially of the bolt, the fastener tends inherently to tighten rather than loosen. Further, as is true of prior-art fasteners of this general type, loosening of the nut is inhibited by interaction of the slow taper cam surfaces 14, since those surfaces are inclined at an angle greater than the thread rise of the bolt.

While the invention is operative when the angle b of the fast taper cam surfaces 16 is in the range of 93°–135°, steeper angles in the range of 93°–100° are particularly advantageous. When such steeper angles are employed, it is particularly advantageous to employ the rounded surfaces 19 at the junctures between adjacent surfaces 13 and 16, so that interference between the two washer members during tightening is limited more precisely to the interengagement of opposed pairs of the fast taper cam surfaces 16.

Washer members 6 and 7 can be formed of metal, advantageously cold rolled steel, by a coining operation, with surfaces 8 and 9 formed simultaneously by opposed dies in the same operation. The coining die employed to form friction face 9 can then comprise a plurality of identical grooves, the grooves which form the pairs of points 18, 18a simply not being filled by metal flow because those grooves are located in areas where the coining operation produces less flow of metal.

THE EMBODIMENT OF FIG. 10

FIG. 10 illustrates a second embodiment of the invention, wherein members 3 and 4 are secured together by bolt 1, a cooperating nut 102, and a single lock washer member 6. In this embodiment, the end of nut 102 which is directed toward washer member 6 is formed with a cam face 110 identical to cam face 10, FIGS. 1 and 2. Thus, one of the two cooperating cam faces is made integral with the nut. Washer member 6 retains the configuration hereinbefore described.

What is claimed is:

1. In a locking device for use with a threaded fastener, such as a fastener of the bolt-and-nut type, the combination of two locking members, one of said locking members being an annular washer member having a toothed face and a cam face, and the other of said locking members having a cam face which is substantially identical to and capable of mating with said cam face of said washer member, the toothed face of said washer member being in the form of a flat annular surface interrupted by a plurality of teeth which are spaced apart throughout the length of said surface and which provide points of support which are distributed over both the annular length and the radial width of said annular surface and which support the washer member against forces directed axially of the fastener as the fastener is tightened;

said cam face of said washer member comprising a closed circular series of groups of surfaces each including, in order of sequence, a substantially flat crown surface, a slow taper cam surface, a substantially flat low surface, and a fast taper cam surface, said fast taper cam surface of each group being inclined oppositely with respect to said slow taper cam surface of that group and joining said crown surface of the next successive group, said low surfaces lying in a first common plane parallel to said flat annular surface of said toothed face, said crown surfaces lying in a second common plane parallel to said flat annular surface, and said first common plane being substantially nearer said flat annular surface than is said second common plane, whereby said low surfaces are located on relatively thinner portions of the washer member and said crown surfaces are located on relatively thicker portions of the washer member, the surfaces of said groups of surfaces on said washer member being so oriented that, when the washer member is disposed with its cam face directed toward the nut of a bolt-and-nut type fastener, and the order of said cam surfaces is considered in the direction of tightening rotation of the nut, said crown surface will be first and said fast taper cam surface last in each group, said cam faces being complementary so that, when said washer member and said other locking member are placed together cam face-to-cam face, said crown surfaces of said washer member can be mated respectively with said low surfaces of said other locking member and said fast taper cam surfaces of said washer member will respectively engage said fast taper cam surfaces of said other locking member, said slow taper cam surfaces being inclined at an angle which is greater than the thread rise of the fastener, and said fast taper cam surfaces being inclined away from the plane of the locking member at an angle of 93°–135°;

said teeth of said toothed face including a first plurality of teeth each in the form of a raised edge of generally triangular transverse cross section, and a second plurality of teeth, said first plurality of teeth being spaced apart circumferentially of the washer member and each extending generally radially thereacross, each tooth of said first plurality of teeth being located on a different one of said thinner portions of the washer member, the teeth of said second plurality of teeth being mutually independent and located on said thicker portions of the washer member, the teeth of said first and second plurality of teeth all being of substantially the same height and said height being equal to a substantial fraction of the thickness of said thinner portions of the washer member;

tightening of the fastener when said washer member and said other locking member are mated cam face-to-cam face and initially clamped by the fastener causing said fast taper cam surfaces of one of said members to coact with said first taper cam surfaces of the other of said members, such coaction of said fast taper cam surfaces forcing said washer member and said other locking member axially apart and thereby causing said teeth of said washer member to be inserted into the member adjacent thereto in the fastener assembly, the ones of said teeth carried by said thicker portions of said washer member being inserted more deeply than those carried by said thinner portions, and said thinner portions of said washer member thereby being slightly distorted, under the axial clamping forces resulting from tightening of the fastener, with such distortion opposing return of said washer member toward its fully mated position relative to said other locking member.

2. A locking device according to claim 1, wherein said other locking member is a second washer member identical to said first-mentioned washer member;

said fast taper cam surfaces are inclined at an angle of 93°–100°; and the junctures between said fast taper cam surfaces and said crown surfaces are rounded.

3. In a locking device for use with a threaded fastener, such as a fastener of the bolt-and-nut type, the combination of two washer members each having a central opening, a cam face and a toothed face, said cam faces each comprising a closed circular series of groups of surfaces with each group of surfaces including, in order of sequence, a crown surface, a slow-taper cam surface, a low surface, and a fast-taper cam surface, said fast-taper cam surface of each group being inclined oppositely with respect to said slow-taper cam surface of that group at an angle of 93°–135° relative to the plane of the washer member and joining the crown surface of the next successive group, said slow-taper cam surface of each group being inclined at an angle which is greater than the thread rise of the fastener with which the locking device is to be used, said toothed faces each comprising a flat annular surface, a plurality of elongated teeth each extending across said flat annular surface from said central opening toward the outer periphery of the washer member, said elongated teeth being spaced apart circumferentially of the washer member, and a plurality of pairs of raised points, each pair of raised points being located between a different adjacent pair of said elongated teeth and spaced apart along a line extending from said central opening toward the outer periphery of the washer member, said low surfaces of each washer member lying in a first common plane parallel to said flat annular surface, said crown surfaces of each washer member lying in a second common plane parallel to said flat annular surface, and said first common plane being substantially closer to said flat annular surface than is said second common plane, adjacent pairs of said crown surfaces of each washer member being spaced apart by a substantial distance circumferentially of the washer member, and said low surfaces each occupying a portion of the washer member which is markedly thinner than the portions of the washer member occupied by said crown surfaces, each of said elongated teeth being located on a different one of said thinner portions, and each of said pairs of raised points being located on a different thicker portion of the washer member occupied by one of said crown surfaces, said elongated teeth having generally triangular transverse cross sections, said raised points being generally pyramidal, said elongated teeth and said raised points all having substantially the same height and said height being equal to a substantial fraction of the thickness of said thinner portions;

said cam face of each of said washer members being capable of mating with the cam face of the other of said washer members in such fashion that said crown surfaces of one washer member face said low surfaces of the other of said washer members.

* * * * *